(12) United States Patent
Dahlgård Asp

(10) Patent No.: US 11,758,899 B2
(45) Date of Patent: Sep. 19, 2023

(54) RODENT TRAP, METHOD OF TRAPPING AND KILLING A RODENT, AND USE OF A RODENT TRAP

(71) Applicant: AuRoCon A/S, Aars (DK)

(72) Inventor: Preben Dahlgård Asp, Aars (DK)

(73) Assignee: AUROCON A/S, Aars (DK)

(*) Notice: Subject to any disclaimer, the term of this patent is extended or adjusted under 35 U.S.C. 154(b) by 0 days.

(21) Appl. No.: 17/268,614

(22) PCT Filed: Aug. 21, 2019

(86) PCT No.: PCT/DK2019/050246
§ 371 (c)(1),
(2) Date: Feb. 16, 2021

(87) PCT Pub. No.: WO2020/038539
PCT Pub. Date: Feb. 27, 2020

(65) Prior Publication Data
US 2021/0345597 A1    Nov. 11, 2021

(30) Foreign Application Priority Data
Aug. 22, 2018 (DK) .......................... PA 2018 70546

(51) Int. Cl.
*A01M 27/00* (2006.01)
*A01M 23/36* (2006.01)

(52) U.S. Cl.
CPC ............ *A01M 27/00* (2013.01); *A01M 23/36* (2013.01)

(58) Field of Classification Search
CPC ...... A01M 27/00; A01M 23/02; A01M 23/14; A01M 23/16; A01M 23/24; A01M 23/36; A01M 31/00; A01M 23/04
See application file for complete search history.

(56) References Cited

U.S. PATENT DOCUMENTS

| 4,653,221 A | * | 3/1987 | Pratscher .............. A01M 23/04 43/64 |
| 2005/0102887 A1 | | 5/2005 | Lang et al. |

(Continued)

FOREIGN PATENT DOCUMENTS

| CN | 104619166 A | 5/2015 |
| CN | 105792648 A | 7/2016 |

(Continued)

OTHER PUBLICATIONS

WISETRAP OPERATING MANUAL, Verson 1, (Jan. 5, 2017); pp. 1-47.

*Primary Examiner* — Joshua E Rodden
*Assistant Examiner* — Henry Hooper Mudd
(74) *Attorney, Agent, or Firm* — Cermak Nakajima & McGowan LLP; James Creighton Wray

(57) ABSTRACT

Provided herein is an efficient rodent trap device, where the rodent, such as a mouse or a rat, is killed, when the rodent is moving through the rodent trap. The rodent trap includes at least one rodent passage, a trigger mechanism and a killing mechanism. The rodent passage includes a first outer opening and a second outer opening arranged at opposite ends of the rodent passage. The openings provide entries from ambient surroundings. In use, the rodent is led into the trap through the one or the other opening. The trigger mechanism includes one sensor and another sensor, the one sensor arranged between the killing mechanism and the first outer opening and the other sensor is arranged between the killing mechanism and the second outer opening. The killing mechanism includes at least one killing element, which in use enters said rodent passage between the sensors and when actuated by the killing mechanism.

8 Claims, 4 Drawing Sheets

(56) References Cited

U.S. PATENT DOCUMENTS

| | | | |
|---|---|---|---|
| 2008/0236026 A1 | 10/2008 | Lovett | |
| 2011/0072709 A1* | 3/2011 | Patterson | A01M 23/30 43/81 |
| 2015/0150235 A1* | 6/2015 | Chang | A01M 23/34 |
| 2015/0342171 A1* | 12/2015 | Seyss | A01M 25/004 |
| 2016/0302402 A1* | 10/2016 | Fritzborger | A01M 23/30 |

FOREIGN PATENT DOCUMENTS

| | | |
|---|---|---|
| DE | 202017106850 U1 | 1/2018 |
| EP | 3289871 A1 | 7/2018 |
| JP | 2007-037437 A | 2/2007 |
| WO | 2007068971 A1 | 6/2007 |
| WO | WO2013/064146 A1 | 5/2013 |
| WO | 2013064146 A1 | 10/2013 |
| WO | 2013177652 A1 | 12/2013 |
| WO | 2015081963 A1 | 6/2015 |
| WO | 2017078547 A2 | 5/2017 |
| WO | 2018050393 A1 | 3/2018 |
| WO | 2018087247 A1 | 5/2018 |

* cited by examiner

RODENT TRAP, METHOD OF TRAPPING AND KILLING A RODENT, AND USE OF A RODENT TRAP

This application claims the benefit of Danish Application No. PA 2018 70546 filed Aug. 22, 2018 and PCT/DK2019/050246 filed Aug. 21, 2019, International Publication No. WO 2020/038539 A2, which are hereby incorporated by reference in their entirety as if fully set forth herein.

FIELD OF THE INVENTION

The present invention relates to a rodent trap, in particular for trapping mice and/or rats.

BACKGROUND OF THE INVENTION

A rodent trap is designed primary to catch and most often to kill rodents, such as rats and mice. Some traps catch the rodents in a cage without killing the rodent, where other traps are using glue or poison. Some rodent traps are using spring-released mechanism to kill the rodent.

In US2016/0302402 A1 a trap for animals is described. The trap has a rodent passage arranged between the trap and a wall. The trap has an inner passage, where the inner passage is a limited dead-end passage extending in another direction in relation to the rodent passage. The inner passage is provided with a trigger mechanism and a killer mechanism. The problem with this is that the rodent must choose to change direction and choose to enter the inner passage. Furthermore, the rodent must choose to go further into the narrow unknown dead-end inner passage before the trigger mechanism may release the killer mechanism. The trap may be provided with a bait box to lure the rodent into the inner passage. The rodent may easily choose to pass through the trap many times without getting killed. By letting the rodent escape easily makes the trap with some unresolved issues and tasks before being an effective trap.

In WO2007/068971 another type of rodent trap is described. The rodent trap comprises two openings with closing means. The closing means is provided so the rodent is prevented to escape the rodent trap. The rodent trap also comprises a trigger mechanism and a killing mechanism. The killing mechanism comprises killing gas or electrocuting means for extermination of the rodent. The extermination of the rodent is unreliable and does not ensure a quick and certain kill, and eventually the rodent suffers unnecessary. Once the rodent inside the rodent trap is exterminated, the rodent trap must be emptied manually before the rodent trap can be useful again. The costs of maintaining the trap is therefore high, due to the costs of man hours.

OBJECT OF THE INVENTION

The object of the invention is to provide an efficient rodent trap device, where the rodent, such as a mouse or a rat, is killed, when the rodent is passing into the rodent trap, and where presence of a rodent in the trap is detected accurately both in relation to presence in the trap and in relation to position in the trap.

DESCRIPTION OF THE INVENTION

The present invention addresses this by providing a rodent trap, where the rodent trap comprises at least one rodent passage, a trigger mechanism and a killing mechanism, where a killing element of the killing mechanism comprises at least one rigid component, where said killing element is arranged for and capable of entering said running passage, where said rodent passages comprises at least one first outer opening and at least one second outer opening arranged in opposite ends of said rodent passage, where said first outer opening and said second outer opening provide entries from ambient surroundings, where in use the rodent is led into the trap through the first outer opening or the second outer opening, said trigger mechanism comprises at least one first sensor and at least one second sensor, where at least one of said first sensor is arranged between said killing mechanism and said first outer opening and at least one of said second sensor is arranged between the killing mechanism and said second outer opening, each of the sensors capable of detecting presence of a rodent, said killing element being actuated when each of the at least one first sensor and the at least second sensor detects presence of a rodent in the rodent passage, and where said killing element, when actuated, enters said rodent passage.

The rodent trap comprises a plurality of outer openings, which leads into rodent passages, arranged so that a rodent may be led into the rodent trap. The rodent passage may have a shape similar to a tube or a pipe. When the rodent is entering the rodent trap, the rodent will try to pass through the rodent passage and out of another outer opening, which may be arranged in front of the rodent's viewing angle. The rodent will then trigger the trigger mechanism causing the killing mechanism to actuate the killing element exactly in the moment the rodent passes the killing element.

The rodent trap may comprise at least two outer openings. The two outer openings may be arranged at opposite ends of the rodent passage. Preferably, the rodent passage may be arranged in a straight line, so the rodent easily passes the rodent passage without changing direction radically. The rodent may see the exit and therefore easily choose to pass in a forward direction.

The rodent passage may be divided into one or more parts or sections, but still having shape of a rodent passage inside the rodent trap. A section or part of the rodent passage may be the killing zone, where the rodent is killed.

The material of the rodent passage may be any kind of polymer, concrete and/or metal, or even a combination of those. The rodent passage may be prepared in whole or in parts. If the rodent passage for example is prepared in parts, the parts are assembled accordingly.

The killing mechanism must provide a reliable killing, so that when the rodent enters the killing zone, the rodent must be killed in a fast and efficient manner. The killing element may be a rigid component or components, which may be triggered by an actuator. The killing element may comprise spikes, guillotine, bolt or piston, which may cover the whole or parts of the killing zone when actuated. This ensures a quick and certain kill.

The first and the second sensors may be activated by infrared radiations, detecting thermal radiation from the rodent. The sensors may also be chosen as optical, thermal, mechanical or electrical sensors or even used in a combination to ensure the detection of a rodent located in the correct position in the killing zone.

The rodent trap may in particular be used for trapping mice and/or rats, but might as well be designed for other species of rodents. The rodent trap catches and kills the rodent, when the rodent is in motion and tries to pass through the rodent trap. The rodent does not need to stop and consider if the rodent should change direction into a narrow dead end or to eat poison. The rodent trap catches/kills the rodent, regardless what direction the rodent enters the killing zone. The rodent trap provides a very high degree of reliability that the rodent is killed in a fast and reliable manner.

In an advantageous embodiment of the invention, a killing zone of said rodent passage is elevated in relation to said first and said second outer opening, arranging a first slope rodent passage from said first outer opening to said killing zone and a second slope rodent passage from said second outer opening to said killing zone.

When the rodent is killed by the killing mechanism, the muscular contraction of the newly killed rodent provides a method for removing the rodent from the rodent trap. By providing a slope rodent passage, preferably before and after the killing mechanism, the rodent will roll or jump out of or partly out of the rodent trap, with help from the muscular contractions and the gravity. The rodent may move down the slope rodent passage towards and through one of the outer openings. Maybe even move away from the rodent trap.

In a further advantageous embodiment of the invention, said killing zone of said rodent passage is elevated in an angle of 10°-50° in relation to said first outer opening and said second outer opening.

The height and distance between a predefined fix point at the inner surface of the killing zone and a predefined fix point at the bottom surface of the first outer opening or the said second outer opening is defined by an angle of inclination of slope rodent passage. The first angle is measured from the first slope rodent passage from said first outer opening to the killing zone, preferably within the angle of 10°-50°. The angle depends on the height and distance between the predefined fix points. The second angle is measured from the second slope rodent passage from said second outer opening to said killing zone, also preferably within the angle of 10°-50°.

The angle may also be chosen to be between 35°-50°, to ensure that the rodent will roll or jump out of the rodent trap more easily. An important issue is also to take into consideration that the form of the slope must tempt and thereby lure the rodent to choose the way into the rodent trap. The form of the slope may start with a small climb and then when the rodent is inside the slope rodent passage the slope may increase up to a plateau, either flat and/or curved, formed by the killing zone's inner surface.

In a still further advantageous embodiment of the invention, said killing mechanism is attached to said killing zone of said rodent passage, where in use the killing element enters the said killing zone through an aperture in the rodent passage.

The killing mechanism may be arranged outside the rodent passage, and through an aperture in the rodent passage a killing element may preferably be arranged substantially flush the inner surface of the killing zone. When actuating the killing element, the killing element will kill a rodent within a predefined killing zone.

The killing zone of the rodent passage may have a part of the inner surface formed as a flat plateau. The rodent will enter the killing zone, presumably with a given speed of rodent. Either the first or the second sensor will detect the rodent at first depending on which direction the rodent is coming. The rodent may continue the forward motion and pass the killing element. When the other sensor on the opposite side of the killing element detects the rodent, it means that the rodent is located in the killing zone by the killing element. Then the trigger mechanism will actuate the killing mechanism and the killing element will be released and kill the rodent.

In a further advantageous embodiment of the invention, said killing element is actuated by compressed air.

The killing mechanism may be actuated using a pneumatic mechanism, for example compressed air or other types of gasses. The killing mechanism actuates the killing element by using compressed air. The air rapidly exerts a force to the killing element, when released. The killing mechanism may also be actuated by a mechanically operated mechanism, such as a spring actuated mechanism, or an electrically operated mechanism, such as a servo-operated mechanism, possibly powered by a battery, or a magnetically operated mechanism, or perhaps a combination of two or more of a pneumatically, a mechanically, an electrically and/or a magnetically operated mechanism.

The container containing the compressed air or gas may easily be maintained and replaced, for example when the container is empty.

In a still further advantageous embodiment of the invention, a part of said rodent trap is arranged inside a protection cabinet, where said first outer opening and said second outer opening are arranged outside said protection cabinet, providing an entrance path for the rodent into the rodent trap.

The rodent trap is arranged inside a protection cabinet for safety measure. Due to the length of the rodent passage and the protection cabinet, this rodent trap is safe and not dangerous to for example children and family pets.

Furthermore, the protection cabinet may also be provided in a design, discreet and fitting into the surroundings. In use, the protection cabinet increases the stability and robustness of the rodent trap, when the rodent trap is in use, for example by attaching the protection cabinet to a side wall or floor/ ground. Maintenance, repair and cleaning are also an easy task and far from complicated. The protection cabinet may be opened from the sides and/or front.

In a further advantageous embodiment of the invention, said trigger mechanism activates the killing mechanism when both the first sensor and the second sensor are active at the same time.

Before the killing mechanism actuates the killing element, the first sensor and the second sensor may be active at the same time. The rodent entrance into the rodent passage may be through the first outer opening or second outer opening. Depending on the rodent entrance opening, either the first or the second sensor will be active prior to the other. When the rodent moves forward, preferably without any stop or possibility of change in direction, both sensors will at a point be active at the same time. Since the killing element is located between the first sensor and the second sensor, part of the rodent will be located in the killing zone. Then the trigger mechanism activates the killing mechanism as both the first sensor and the second sensor are activated at the same time. The killing mechanism releases the killing element, which moves rapidly into the killing zone and kills the rodent.

In a still further advantageous embodiment of the invention, a control unit is in communication with an external device.

It is necessary to monitor the rodent trap to determine whether a rodent has been dispatched or the trap has been deactivated by error or otherwise. A rodent trap may be located in many different locations, as barns, attics, basements, animal cages etc. and therefore difficult to check physically. Manual check of the rodent trap is inconvenient and leads to high maintenance costs and time consumption, especially if the manual checking is performed by a professional rodent control company.

The control unit may control the data form the trigger mechanism according to predetermined parameters before activating the killing mechanism. This will prevent a failure trigger causing the actuating of the killing element at the wrong time. The control unit may also control the withdrawal of the killing element as soon as possible after killing a rodent. By moving the killing element out of the killing zone and into killing position, the withdrawal will provide free space for the newly killed rodent to roll or jump out of the rodent trap.

The rodent trap may be provided with a wired or wireless communication system, which may be controlled by a remote unit. The remote unit may be located near by the rodent trap or be in another location such as a central control station. The remote unit may be a portable unit specifically designed to one or more rodent traps or it may be integrated into a portable or stationary computer, e.g. an app on the phone or pad and/or a program installed on a computer. The app or program access data derived from the rodent trap, where the data may be allocated in a cloud system. The remote control unit and/or system may also provide new configuration to and/or reprogram and adjust the rodent trap from a remote location. The control unit and/or system provide an effectively monitoring and/or controlling of the rodent trap, reducing both time and maintenance costs.

The invention furthermore comprises a method of trapping and killing rodents, said method comprises providing a rodent trap, where said rodent trap comprises at least one rodent passage with a first outer opening and a second outer opening arranged at opposite ends of said rodent passage, a trigger mechanism comprising a first sensor and a second sensor, and a killing mechanism comprising a killing element, where the killing element is arranged so the killing element is moveable in a killing zone located inside said rodent passage, where
- a rodent passing through one of the first outer opening and the second outer opening and into said rodent passage, one of said first sensor and said second sensor firstly detecting the rodent passing in a direction through the rodent passage towards the other and oppositely arranged first outer opening or second outer opening, said killing element maintained in position outside the killing zone, and the rodent passing the killing element, subsequent to which the other of said first sensor and said second sensor detecting the rodent, said trigger mechanism actuating the killing mechanism, when both said first and second sensors detects presence of a rodent, and the killing mechanism actuating the killing element, and the killing element killing the rodent A method of trapping rodents using a rodent trap is provided by a rodent trap catching a rodent moving through the rodent trap. The rodent trap which comprises at least one rodent passage with a first outer opening and a second outer opening arranged in opposite ends of said rodent passage. The rodent may chose the nearest entrance opening, seeing the opening as a safe passage away from the open surroundings. A killing mechanism comprises a killing element, where the killing element is arranged so the killing element is moveable in a killing zone located inside said rodent passage. A trigger mechanism comprises at least one first sensor and at least one second sensor arranged on opposite sides of a killing element. A first rodent chooses to pass through the first outer opening and into the rodent passage. The rodent is continuing the pass into the rodent trap in a forward direction. The first sensor, arranged between the first outer opening and the killing element, is detecting the first rodent passing through the rodent passage toward the killing element. The killing element is being kept in position outside the killing zone, where part of the first rodent is passing the killing element passing partly through the killing zone, where said second sensor is detecting the first rodent.

The trigger mechanism is activating the killing mechanism when both said first and second sensors are active at the same time, as both sensors detecting the first rodent before and after the killing element at the same time. The killing mechanism is then actuating the killing element and the killing element instantly killing the rodent.

Following the killing of the first rodent, a second rodent chooses to pass through the second outer opening into the rodent passage. The rodent runs into the rodent trap in a forward direction. The second sensor is arranged between the first outer opening and the killing element. The second sensor is detecting the second rodent passing through the rodent passage towards the killing zone. The killing element is being kept in position outside the killing zone. Part of the second rodent is passing the killing element in the killing zone, where the first sensor is detecting the first rodent. The trigger mechanism is activating the killing mechanism, when both the first and second sensors are active, as both sensors detecting the second rodent before and after the killing element at the same time. The killing mechanism is actuating the killing element and the killing element is killing the rodent.

DESCRIPTION OF THE DRAWING

Embodiments of the invention are described in the following with respect to.

DETAILED DESCRIPTION OF THE INVENTION

Figure 1:
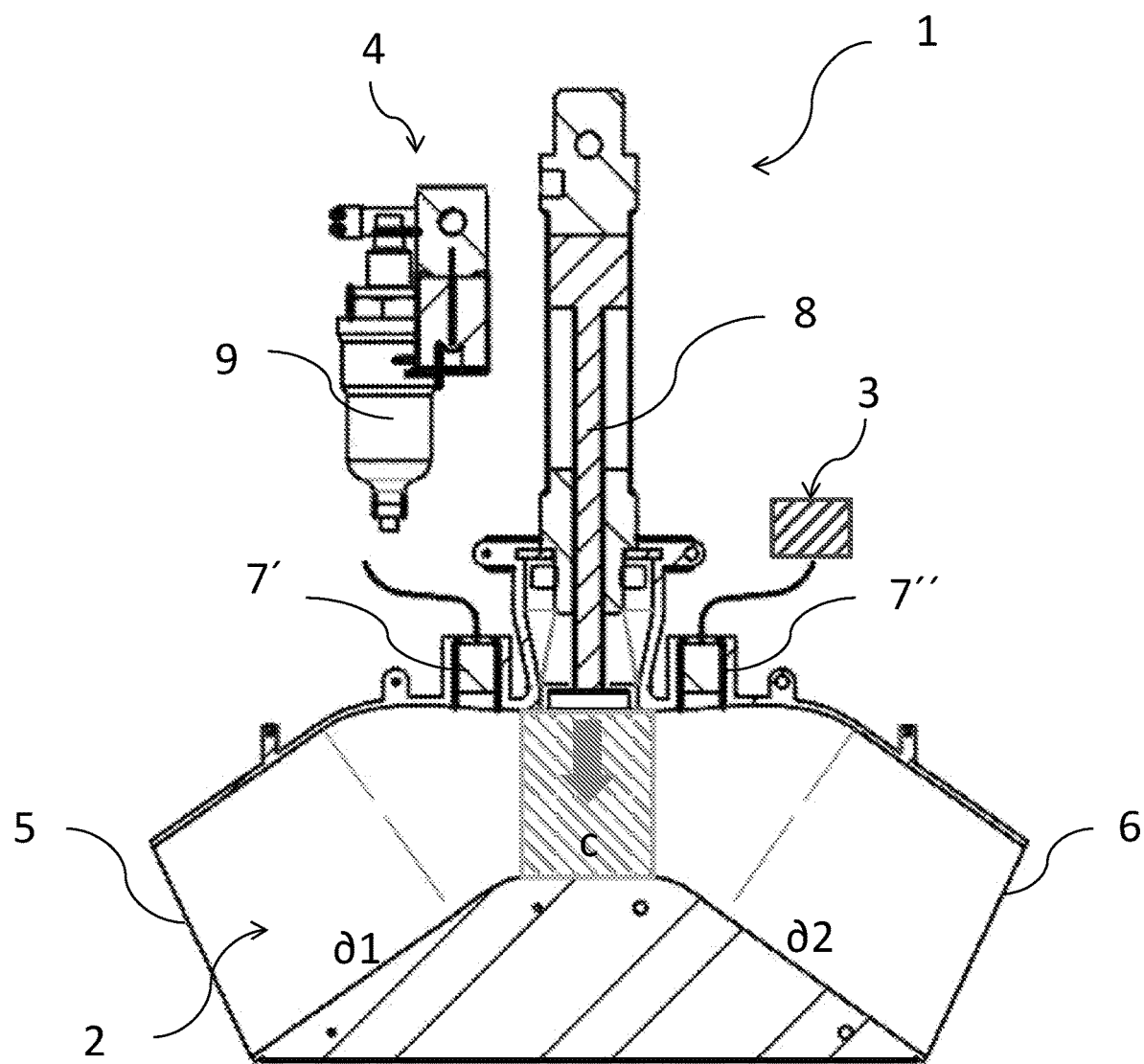
FIG. 1: Illustrating a cross section of an embodiment of a rodent trap.

An embodiment of the invention is explained in the following detailed description. It is to be understood that the invention is not limited in its scope to the following description or illustrated in the drawings. The invention is capable of other embodiments and of being practiced or carried out in various ways.

FIG. 1 illustrates a cross section of an embodiment of a rodent trap 1. The rodent trap 1 comprises one rodent passage 2, a control unit 3 comprising the trigger mechanism, where a first sensor 7' and a second sensor 7" are connected, and a killing mechanism 4. The killing mechanism comprises a killing element 8, which in this example is a piston. The piston may cover the whole or parts of the killing zone when actuated, which ensures a quick and certain kill.

The rodent passage 2, in this example of the embodiment formed as a curved tunnel or a curved tube, comprises a first outer opening 5 arranged in one end of the rodent passage 2. A second outer opening 6 is arranged in the opposite end in relation to the first outer opening 5 of the rodent passage 2. The rodent may enter either the first outer opening 5 or the second outer opening 6.

The trigger mechanism is controlled by the control unit 3. The control unit 3 detects movements in the rodent passage 2 by measuring the values of one first sensor 7' and the second sensor 7" in relation to predefined parameters. The first sensor 7' is arranged between said killing mechanism 4 and the first outer opening 5. The second sensor 7" is arranged between the killing mechanism 4 and said second outer opening 6. The first and the second sensors 7', 7" may be IR sensors, activated by thermal radiation from the rodent.

Both the first sensor 7' and the second sensor 7" are active at the same time, when the rodent in the rodent passage 2 passing the killing mechanism 4. The control unit 3 detects a signal from the trigger mechanism 3. The control unit sends a signal to the killing mechanism 4, causing the killing mechanism 4 to release the compressed gas contained in the container 9. When the compressed gas actuates the killing element 8 and the killing element is rapidly moved into the rodent passage 2.

A plurality of apertures is provided in the rodent passage 2. The sensors 7', 7" and the killing mechanism 4 are arranged in the apertures in direct contact with the rodent passage so sensors and killing elements may be attached with direct access to the rodent's passing path in the rodent passage 2. The direct access will for example provide a free view for the sensors 7', 7" in the rodent passage. The killing element 8 is connected directly to container 9. The container 9 contains compressed air and the container 9 is controlled by the killing mechanism 4. The killing mechanism 4 is also arranged next to the killing element 8. The killing element is arranged in the aperture provided with a direct access to the rodent passage 2. The killing element 8 can therefore easily enter the rodent passage 2, when being actuated. When the killing element 8 is being actuated the killing element is moved in a predetermined direction into a killing zone c, illustrated by the arrow.

The killing zone c is a part of the rodent passage 2, and is elevated in relation to the first outer opening 5 and/or the second outer opening 6. The elevation of the killing zone c leads to a first slope rodent passage, given by $\partial 1$, from said first outer opening to said killing zone. A second slope rodent passage given by $\partial 2$, from said second outer opening to said killing zone. The inclination of the slope $\partial 1$ compared to the slope $\partial 2$ may be chosen differently from each other, where in this embodiment the slopes are substantially equal to each other.

The first angle is measured from the first slope rodent passage $\partial 1$ from said first outer opening to the killing zone in relation to the horizontal ground, preferably within the angle of 10°-50°, alternatively between 35°-50°. The second angle is measured from the second slope rodent passage $\partial 2$ from said second outer opening to said killing zone, also preferably within the angle of 10°-50°, alternatively between 35°-50°.

When a rodent enters the rodent passage 2 from the first outer opening 5, the rodent will try to pass through the rodent trap 1, without any stop or change of direction which may cause confusion for the rodent. The rodent will reach the killing zone c of the rodent passage 2, continuing the pass in a forward direction. The rodent will be detected by the first sensor 7', still moving forward. Thereafter the rodent will be detected by the second sensor 7". This will cause the trigger mechanism to activate the killing mechanism and the rodent will be killed.

Figure 2:
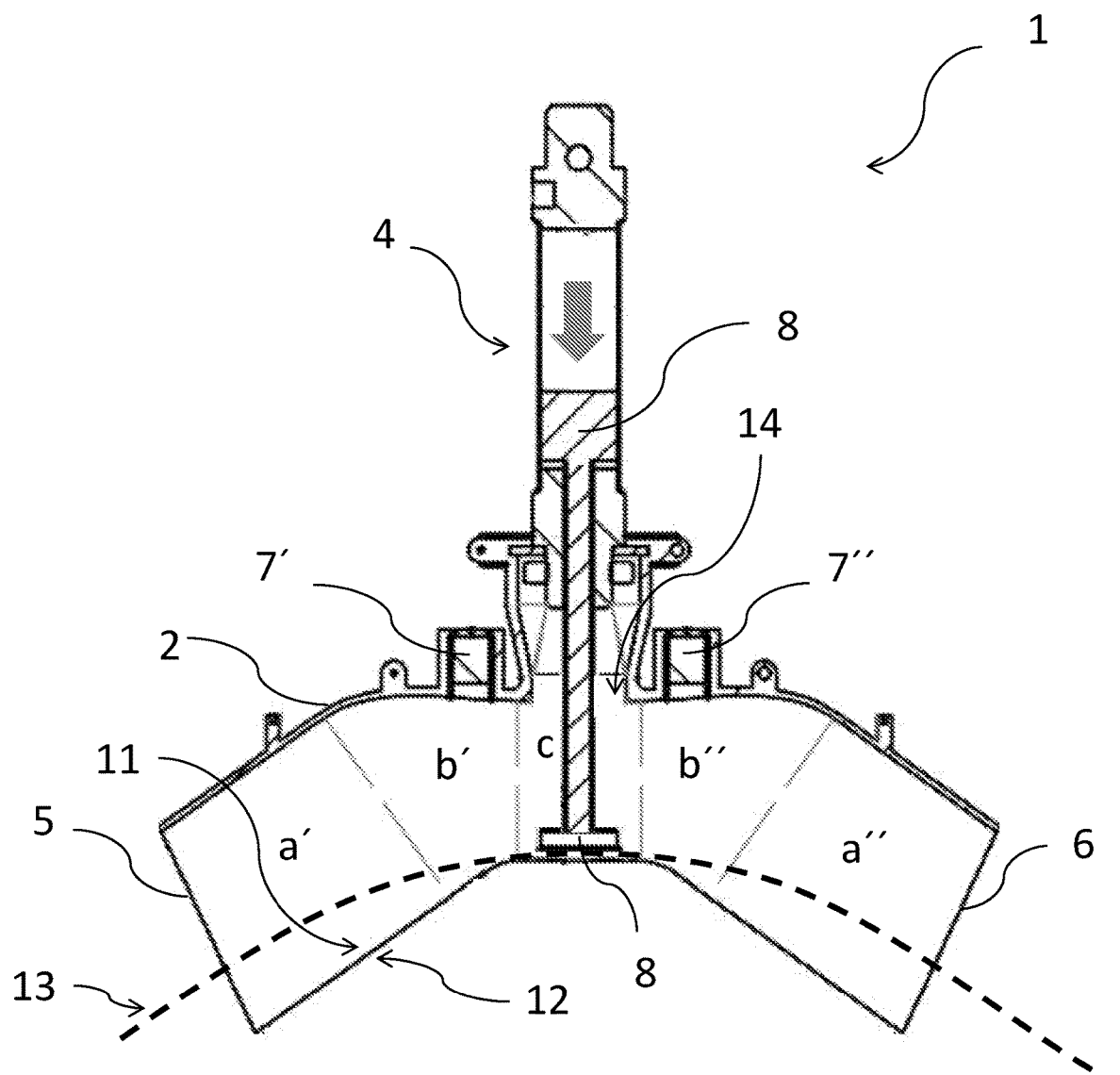
FIG. 2: Illustrating a cross section a rodent trap releasing the killing element.

FIG. 2 illustrates a cross section of a rodent trap 1 releasing the killing element 8. The rodent trap's 1 rodent passage 2 may be illustrated as a passage divided into several zones. The zones are following: an entrance zone a', a", a detecting zone b, b" and a killing zone c. The rodent passage 2 has an inner surface 11 and an outer surface 12. The killing mechanism 4 is arranged outside the rodent passage 2, partly attached to the outer surface 12. The killing element 8 is arranged inside an aperture 14 arranged in the rodent passage 2, which provides a direct access for the killing element 8 to extend into the killing zone c, when actuated by for example compressed air.

The rodent enters the rodent passage 2 from the first outer opening 5, following the rodent path 13. The rodent will try to pass through the rodent trap 1 in a straight line, without any stop or change of direction. The rodent will first pass into the entrance zone a', rodent slightly upwards. When the rodent reaches the detecting zone b', the rodent will be detected by the first sensor 7' which becomes active. The rodent will still pass forward. The rodent will reach the killing zone c of the rodent passage 2, and continue the pass in a forward direction. The front head of the rodent will then be detected by the second sensor 7" in detection zone b", and the second sensor 7" will also become active. This will cause the trigger mechanism to activate the killing mechanism 4 and the rodent will be killed.

The rodent may choose to enter the rodent passage 2 from the second outer opening 6 instead of the first outer opening 5, and the rodent will also following the rodent path 13. The rodent will first pass into the entrance zone a", rodent slightly upwards. When the rodent reaches the detecting zone b", the rodent will be detected by the second sensor 7" which then becomes active. The rodent will reach the killing zone c, and continue the pass in a forward direction. The front head of the rodent will then be detected by the first sensor 7' in detection zone b', and the first sensor 7" will also become active. This will cause the trigger mechanism to activate the killing mechanism 4 and the rodent will instantly be killed.

Shortly after the rodent is killed, the killing element 8 is moved out of the killing zone c, and into a killing position inside the aperture 14. Placed in the killing position, the killing element 8 will be substantially flush with the inner surface 11 of the rodent passage 2. After the rodent has been killed, the body of the rodent will move by itself due to the muscular contraction. By moving the killing element 8 out of the killing zone and into killing position in the aperture 14, the killing zone c will be free again, without any obstacles to prevent the newly killed rodent to roll or jump out of the rodent trap 1.

The newly killed rodent may move, roll or jump downwards one of the slope rodent passage and out of one of the outer openings 5 or 6. Due to the slope and the smoothness of the inner surface of the rodent passage, the newly killed rodent will easily roll or jump away from the killing zone c. Maybe even move further away from the rodent trap 1, with help from the muscular contractions and the gravity.

It is necessary to monitor the rodent trap 1 to determine whether a rodent has been dispatched or the rodent trap 1 has been deactivated by error or otherwise.

The control unit 3, showed in FIG. 1, may control the data from the trigger mechanism according to predetermined parameters. The control unit 3 may also control the withdrawal of the killing element 8 as soon as possible after killing the rodent. By moving the killing element 8 out of the killing zone c and into killing position in the aperture 14, the withdrawal will provide free space inside the rodent passage 2 for the newly killed rodent to roll or jump out of the rodent trap 1.

Figure 3:
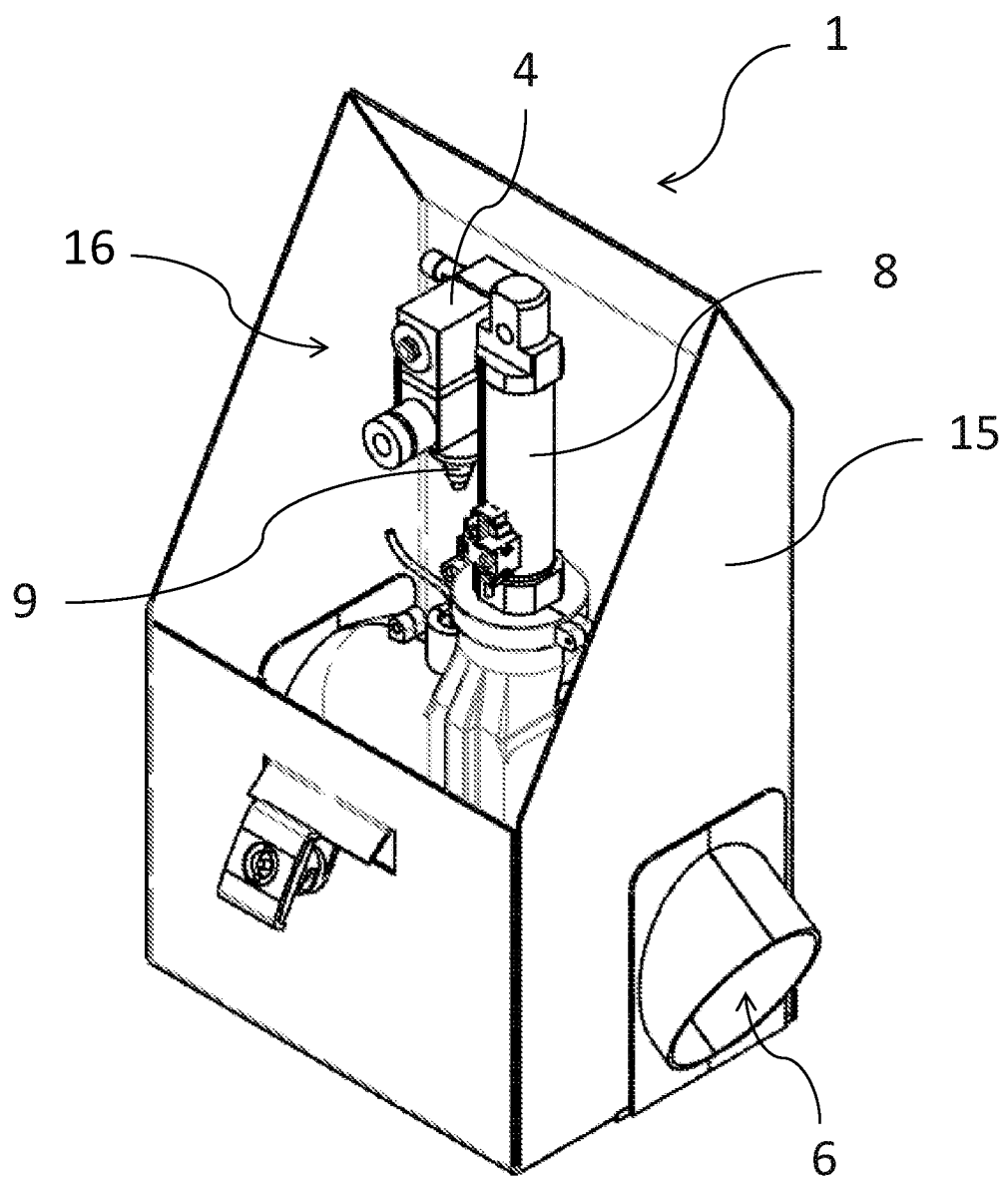
FIG. 3: Illustrating an embodiment of a rodent trap arranged in a cabinet.

FIG. 3 illustrates an embodiment of a rodent trap 1 arranged in a protection cabinet 15. Most parts of said rodent trap 1 are arranged inside a protection cabinet 15 for safety reasons. The parts may be such as the killing mechanism 4, killing element 8, the container 9 the sensors 7',7" and most of the rodent passage 2. The first outer opening 5 and said second outer opening 6 are arranged outside said protection cabinet 15, providing an entrance into the rodent trap 1. To prevent failure trigger causing the actuating of the killing element 8 at a wrong time, the sensors may also be provided in the protection cabinet 15 so that the detection angle of the sensors is detecting the rodent before the rodent enters the rodent trap 1.

The width of the protection cabinet 15 is depended on the length of the rodent passage 2. The outer openings 5, 6 are arranged outside the protection cabinet 15. The length of the rodent passage 2 and the protection cabinet 15 is some of the primary safe precautions to prevent for example children and family pets to reach the killing zone inside the rodent trap 1.

The protection cabinet 15 may also be provided in a discreet and functional design by fitting into the surrounding. The protection cabinet 15 is provided with a front opening 16. A door or a flap may cover the front opening 15. The maintenance, repair and cleaning are an easy task and far from complicated, when having direct access to the rodent trap 1 through the front opening 15.

The rodent trap 1 is provided with a control unit, preferably including a wireless communication system, not showed on the FIG. 4 a. The control unit is controlled by a remote unit outside the protection cabinet 15. The remote unit may be located near by the rodent trap, even on the outside of the protection cabinet 15, or be in another location such as a central control station.

Figure 4A:
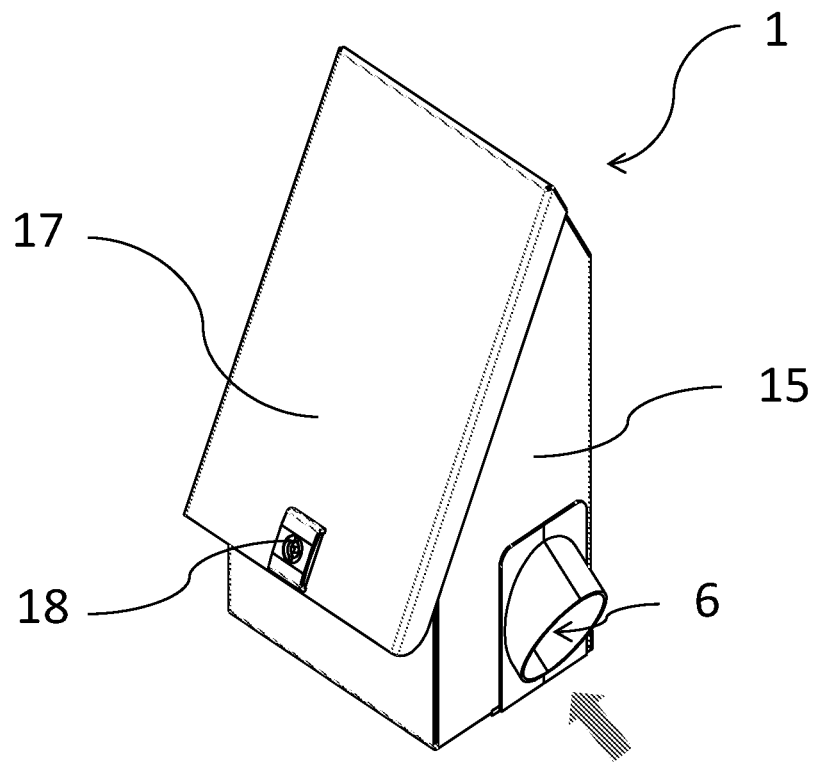
FIG. 4a,b: Illustrating an embodiment of a rodent trap arranged in a locked cabinet.
Figure 4B:
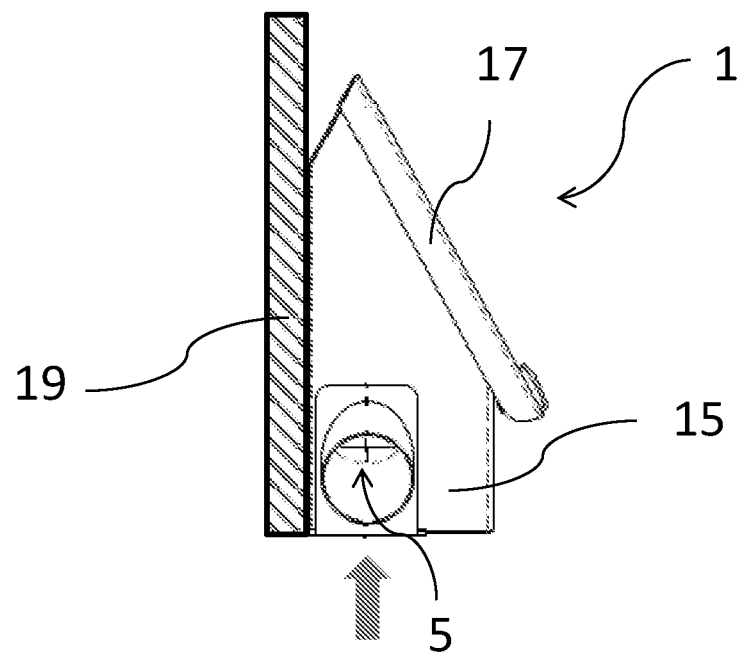

FIG. 4a and FIG. 4b illustrates an embodiment of a rodent trap arranged inside a locked protection cabinet 15.

FIG. 4b shows a locked protection cabinet 15. The opening provided in the protection cabinet 15 is covered with a lid 17. The lid 17 is locked to the cabinet 15 by using locking means 18. When the protection cabinet is locked, the only way into the rodent trap 1 is through the outer openings 5,6. The arrangement of the outer openings 5,6 is showed on FIG. 1.

The rodent trap inside the protection cabinet may be accessed for maintenance reasons. By unlocking the locking means 18, and there after removing or tilting the lid away from the opening of the protection cabinet 15, an access into the rodent trap is then provided.

FIG. 4b shows the protection cabinet being placed adjacent to a wall 19. The protection cabinet 15 increases the stability and robustness of the rodent trap 1, when the rodent trap 1 is in use, for example by attaching the protection cabinet 15 to the wall 19 or floor/ground The rodent, such as a mouse or a rat will typically spend a significantly greater amount of time exploring the periphery of the arena, usually in contact with the walls rather than the unprotected surroundings. The outer openings 5, 6 are therefore arranged close to the wall 19, so that the rodent easily may choose to pass into the outer openings 5, 6.

The invention claimed is:

1. Rodent trap comprising at least one rodent passage, a trigger mechanism and a killing mechanism, where a killing element of the killing mechanism comprises at least one rigid component, where said killing element is arranged for and capable of entering said rodent passage, where
   said rodent passage comprises at least one first outer opening and at least one second outer opening, said at least one first and second outer openings arranged at opposite ends of said rodent passage, where said first outer opening and said second outer opening provide entries from ambient surroundings of the rodent trap, where in use the rodent is led into the trap through the first outer opening or through the second outer opening,
   said trigger mechanism comprises at least one first sensor and at least one second sensor, where at least one of said first sensor is arranged between said killing mechanism and said first outer opening and at least one of said second sensor is arranged between the killing mechanism and said second outer opening, each of the sensors capable of detecting presence of a rodent,
   said killing element being actuated when both of the at least one first sensor and the at least second sensor detects presence of a rodent in the rodent passage, and where said killing element, when actuated, enters said rodent passage,
   said killing zone being arranged in the rodent passage whereby the rodent crosses the killing zone when passing through the rodent passage moving from the first outer opening towards the second outer opening or vice versa,
   wherein the killing zone of said rodent passage in use is elevated in a vertical direction in relation to said first and said second outer openings, forming an upwards extending rodent passage from said first outer opening to said killing zone and an upwards extending rodent passage from said second outer opening to said killing zone, thereby providing a first sloped rodent passage part from said first outer opening to said killing zone and a second sloped rodent passage part from said outer opening to said killing zone whereby the rodent passage is configured so that after the action of the killing mechanism the rodent will move down the first or second sloped rodent passage towards one of the first and second openings with help from muscular contractions and/or gravity.

2. Rodent trap according to claim 1, where said an upwards extending rodent passages extend in an angle of 10°-50° in relation to a horizontal level at said first outer opening and said second outer opening.

3. Rodent trap according to claim 1, said killing mechanism being attached to said killing zone of said rodent passage, where in use the killing element enters said killing zone through an aperture in the rodent passage.

4. Rodent trap according to claim 1, where said killing element is actuated by compressed air, said compressed air provided in a compressed air cylinder of the killing mechanism, said compressed air cylinder, during use of the rodent trap, capable of being released from and of being attached to the killing mechanism.

5. Rodent trap according to claim 1, where the rodent trap has an outer cabinet, where said first outer opening and said second outer opening are arranged outside said outer cabinet, providing an entrance path for the rodent rom the ambient surroundings and into the outer cabinet.

6. Rodent trap according to claim 1, where said trigger mechanism only activates the killing mechanism, when both the first sensor and the second sensor at the same time detect presence of a rodent in the rodent passage.

7. Rodent trap according to claim 6, where the rodent trap comprises a signal transmitting unit capable of communicating with a signal receiving unit by transmitting signals of a state of the killing mechanism to a user interface of the signal receiving unit.

8. Method of trapping and killing rodents, said method comprises providing a rodent trap, where said rodent trap comprises at least one rodent passage with a first outer opening and a second outer opening arranged at opposite ends of said rodent passage, a trigger mechanism comprising a first sensor and a second sensor, and a killing mechanism comprising a killing element, where the killing element is arranged so the killing element is moveable in a killing zone located inside said rodent passage, where a rodent passing through one of the first outer opening and the second outer opening and into said rodent passage, one of said first sensor and said second sensor firstly detecting the rodent passing in a direction through the rodent passage towards the other and oppositely arranged first outer opening or second outer opening, said killing element maintained in position outside the killing zone, and the rodent passing the killing element, subsequent to which the other of said first sensor and said second sensor detecting the rodent, said trigger mechanism actuating the killing mechanism, when both said first and second sensors detects presence of a rodent, and the killing mechanism actuating the killing element, and the killing element killing the rodent, said killing zone is arranged in the rodent passage such that the rodent crosses the killing zone when passing through the rodent passage moving from the first outer opening towards the second outer opening or vice versa, wherein the killing zone of said rodent passage in use is elevated in a vertical direction in relation to said first and said second outer openings, forming an upwards extending rodent passage from said first outer opening to said killing zone and an upwards extending rodent passage from said second outer opening to said killing zone, thereby providing a first sloped rodent passage part from said first outer opening to said killing zone and a second sloped rodent passage part from said outer opening to said killing zone, whereby the rodent passage is arranged so that after the action of the killing mechanism, the rodent will move down the first or second sloped rodent passage towards one of the first or second openings with help from muscular contractions and/or gravity.

* * * * *